D. G. Morris
Machine for Bending Car-Hooks

№ 93,467. Patented Aug. 10, 1869.

Witnesses:
Hinchman
Geo. W. Mabee

Inventor:
D. G. Morris
per Munn & Co
Attorneys.

United States Patent Office.

D. G. MORRIS, OF CATASAUQUA, PENNSYLVANIA.

Letters Patent No. 93,467, dated August 10, 1869.

IMPROVED MACHINE FOR BENDING CAR-HOOKS.

The Schedule referred to in these Letters Patent and making part of the same.

*To all whom it may concern:*

Be it known that I, D. G. MORRIS, of Catasauqua, in the county of Lehigh, and State of Pennsylvania, have invented a new and improved Bending-Machine; and I do hereby declare that the following is a full, clear, and exact description thereof, which will enable others skilled in the art to make and use the same, reference being had to the accompanying drawings, forming part of this specification.

The object of this invention is to provide a simple and efficient machine for bending car-hooks.

It consists of a strong stand, having upon one side a pair of vertical guides, a fixed former, and a bending-lever, and anti-friction wheel all arranged for operation in a manner hereinafter specified.

Similar letters of reference indicate corresponding parts.

Figure 1:
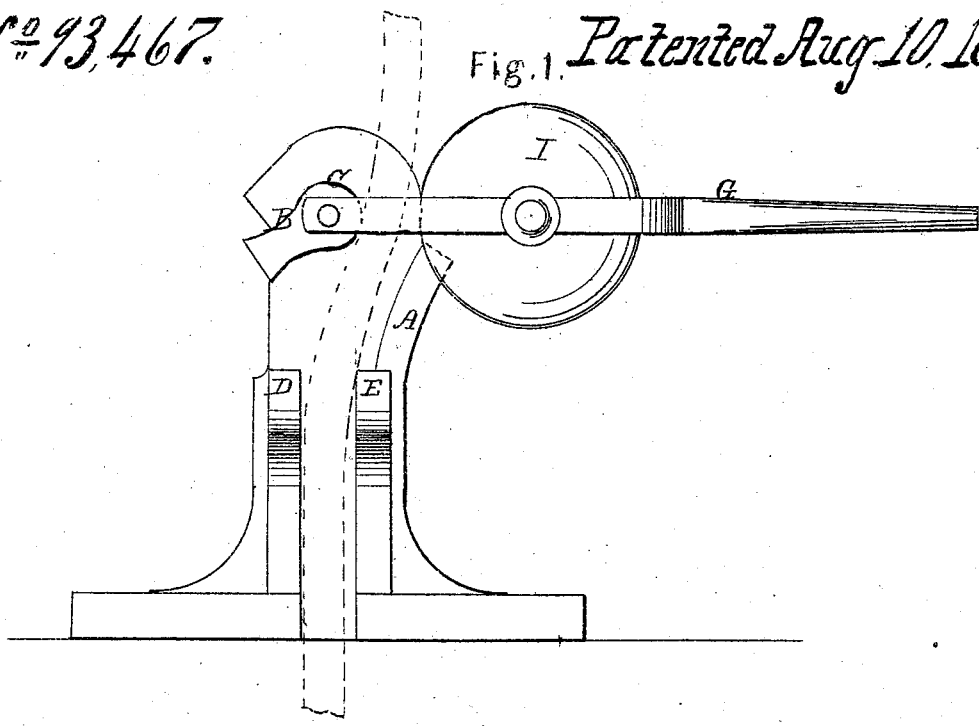
Figure 1 represents a side elevation of my improved machine.
Figure 2:
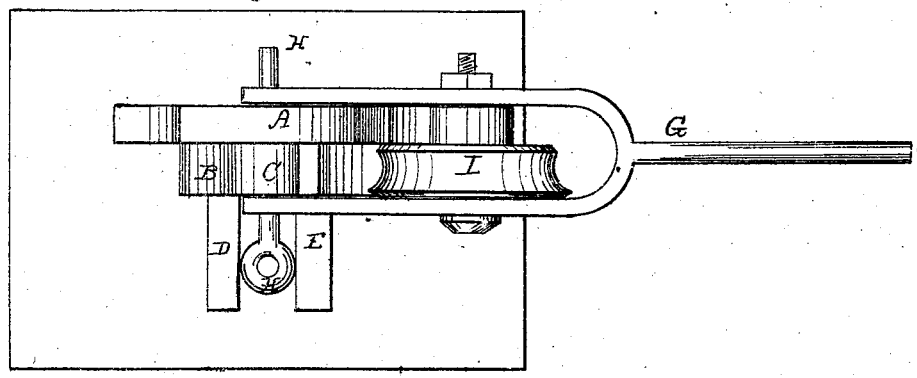
Figure 2 represents a top view of the same.

A represents a strong stand, preferably made of cast-metal, and supported on any suitable base.

B represents a projection near the top, having a rounded face, C, concentric for some distance, and otherwise suitably arranged and adjusted to serve as a fixed former, whereon the bending is to be effected.

Below it are two vertical brackets D E, also projecting from the side of the stand, between which the bar to be bent is placed in a vertical or nearly vertical position, with the end to be bent rising up past the former, the requisite distance. These brackets may, if required, be so placed relatively to the former as to require the bar to be bent to some extent for insertion, or by the act of inserting it between the bracket E and the former, thereby controlling the form of the hook in rear of the principal bend, or at the commencement thereof.

In the axis of the concentric part of the former B, a crotched bending-lever, G, is pivoted to a bolt, H, passing through the former and the stand, to engage both ends of the said crotched lever.

The lever carries in the said crotch a grooved anti-friction bending-wheel, I, which is forced against the iron to be bent by moving the lever over on its axis in a manner well understood.

I am aware that a device for bending couplings and car-hooks has been patented, which represents a combination of five elements, namely, retaining-brackets, former, a bending-roller, a roller to grasp and force down the ends, and an actuating elbow-lever; but by arranging my brackets at a suitable distance out of line with the space between the former and bending-roll, and by using a straight lever, I am enabled to drop the end-bender entirely, and change the entire mode of operation, as well as produce a superior hook.

What, therefore, I desire to claim as my improvement in bending car-hooks, is—

The combination of the former B, the straight forked lever G, and the roller I, which performs the double function of bending the turn of the hook and clasping ends thereof, successively, with the pair of retaining-brackets D E, arranged out of line with the space between the said former and roll.

D. G. MORRIS.

Witnesses:
R. CLAY HAMERSLY,
THOMAS FREDERICK.